United States Patent [19]

Chung

[11] Patent Number: 5,822,013
[45] Date of Patent: Oct. 13, 1998

[54] SELECTIVE PROJECTION IMAGE FREEZE DEVICE

[75] Inventor: Suk-Woo Chung, Suwon, Rep. of Korea

[73] Assignee: Samsung Aerospace Industries, Ltd., Kyeongsangnam-do, Rep. of Korea

[21] Appl. No.: 762,004

[22] Filed: Dec. 11, 1996

[30] Foreign Application Priority Data

Feb. 16, 1996 [KR] Rep. of Korea ................. 96-3909

[51] Int. Cl.⁶ ................................................. H04N 5/44
[52] U.S. Cl. .................... 348/559; 348/560; 348/220; 348/231
[58] Field of Search .................... 348/559, 560, 348/22, 23, 24, 220, 231; H04N 5/44

[56] References Cited

U.S. PATENT DOCUMENTS 5,270,810  12/1993  Nishimura ....................... 348/220

*Primary Examiner*—Sherrie Hsia
*Attorney, Agent, or Firm*—Finnegan, Henderson, Farabow, Garrett & Dunner, L.L.P.

[57] ABSTRACT

An image freeze device comprising a still image output mode selector, a write signal generator for outputting a write signal corresponding to an operational state of the still image output mode selector, a counter for counting a number of column addresses and a number of row addresses when driven by a main clock signal and a number of synchronizing signals, address selectors for designating an area corresponding to the column address and row address outputted from the counter, and a memory for storing image data in an area designated by the address selectors when the memory is write-enabled by the write signal outputted from the write signal generator and for outputting the image data stored in the designated area when the memory is output-enabled by an applied field signal. In case a still image is needed, the image freeze device can selectively project the formerly projected image alone through an image display device. Meanwhile, in the case where the position of an object may be changed, or the projected image is shaken from an outer impact, the image freeze device can realize the exact still image by stopping the corresponding moving image.

11 Claims, 4 Drawing Sheets

SELECTIVE PROJECTION IMAGE FREEZE DEVICE

BACKGROUND OF THE INVENTION (1) Field of the Invention

The present invention relates to an image freeze device. More particularly, the present invention relates to the image freeze device that can selectively stop a moving image outputted on a monitor as occasion demands and output the corresponding one frame of the image alone.

(2) Description of the Prior Art

In general, using a CCD element, an image device outputs an optical image after transforming it into an electrical signal. Transmitted to a display device such as a monitor or a TV, the outputted signal is transformed into an image.

In such an image device as the one mentioned above, the recent trend is that a video presenter is increasingly used that reads the image of an object mounted on a stage and then projects the image by using an independent image display device like a TV. The use of a video presenter can enhance the efficiency of a seminar or a lecture, mainly in the fields of education, advertisement, design, and medical science, since it can effectively project the image of a three-dimensional object or a color pictorial.

A video presenter may be used in both a manuscript mode in which the image of an object located on the stage is obtained and a surveillance mode in which the angle of a CCD camera head is able to be changed but keeps its state of surveillance under operation.

However, in the case where the position of the object may be changed, or an impact from outside may cause the realized image to be shaken, the conventional image device proves to have a defect in that it cannot exactly project the image corresponding to the object.

SUMMARY OF THE INVENTION

An object of the present invention is to provide an image freeze device that selectively captures only the formerly projected image when a still image is needed, and thereby to solve the conventional problem.

In order to achieve the above object, the present invention comprises an image freeze device having means for selecting a still image output mode, a write signal generator for outputting a write signal corresponding to an operational state of the still image output mode selection means, a counter for counting a number of column addresses and a number of row addresses when driven by a main clock signal and a number of synchronizing signals, means for selecting addresses for designating an area corresponding to the column address and row address outputted from the counter, and a memory for storing image data in an area designated by the address selecting means when the memory is write-enabled by the write signal outputted from the write signal generator and for outputting the image data stored in the designated area when the memory is output-enabled by an applied field signal.

In order to achieve the above object, the present invention also comprises a video presenter having a pickup element for transforming a light signal incident from a lens into a corresponding electrical signal, an A/D converter for transforming an analog signal outputted from the pickup element into a digital signal, an image freeze device for storing and outputting the image data outputted from the A/D converter according to an operational state of a still image output mode selection means, an image processing device for processing the image data outputted from the image freeze device and outputting a corresponding luminance signal and a chrominance signal, and an image output device for mixing a luminance signal and a chrominance signal outputted from the image processing device and outputting the corresponding original image signal.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
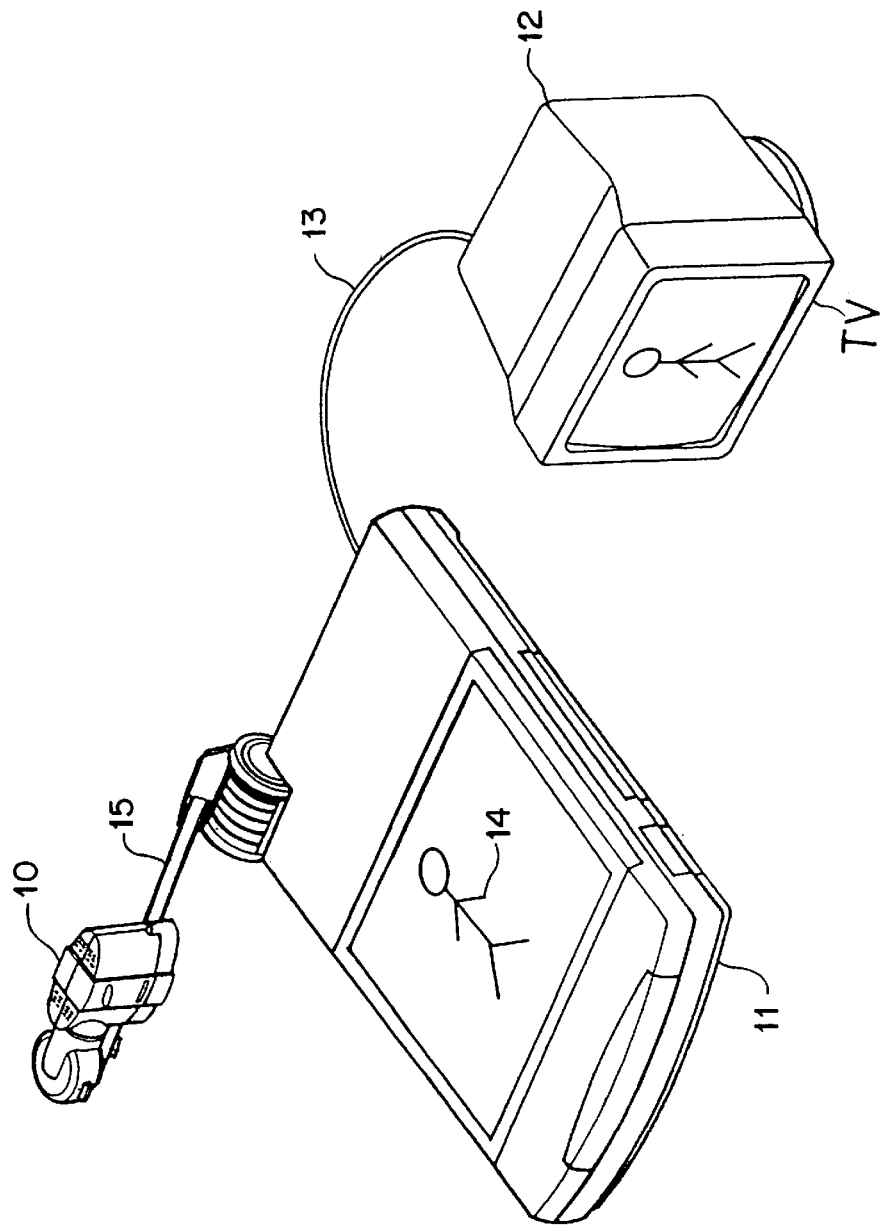
FIG. 1 is a diagram illustrating a state of an operational embodiment of a video presenter in which an image freeze device is installed in accordance with the preferred embodiments of the present invention.

FIG. 1 illustrates a video presentation apparatus in accordance with a preferred embodiment of the present invention. The apparatus includes video presenter 10, stage 11, and monitor 12. Video presenter 10 connects to arm 15, which pivotally connects to stage 11. An output port of video presenter 10 interfaces with monitor 12 via cable 13. Generally, video presenter 10 reads an image of object 14 mounted on stage 11, and then projects the image via the output port to monitor 12.

Figure 2:
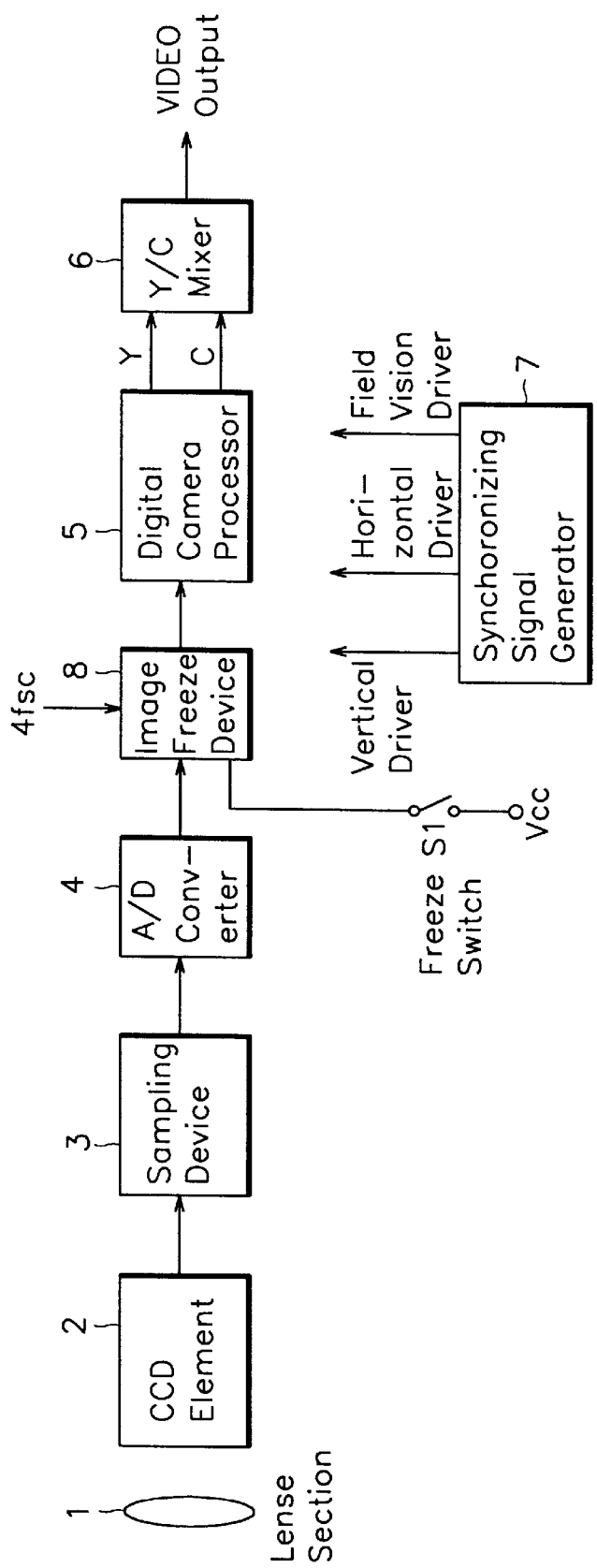
FIG. 2 is a block diagram illustrating a video presenter in which an image freeze device is installed in accordance with the preferred embodiments of the present invention.

FIG. 2 illustrates a block diagram of video presenter 10 in accordance with an embodiment of the present invention. As shown, video presenter 10 comprises lens section 1, charged-coupled device (CCD) element 2, sampling device 3, A/D converter 4, digital camera processor (DCP) 5, Y/C mixer 6, synchronizing signal generator 7, image freeze device 8, and freeze switch Si. Lens section 1 picks up the image of object 14, and feeds the image, which is in form of a light signal, to CCD element 2. CCD element 2 then transforms the image into a corresponding electrical signal.

Sampling device 3 removes the noise from the electrical signal at the output terminal of the CCD element 2. A/D converter 4 then transforms the electrical signal from sampling device 3 into a corresponding digital signal. The digital signal is inputted to image freeze device 8, which selectively captures the digital signal when freeze switch S1 is turned on in accordance with the still image output mode of image freeze device 8.

DCP 5 processes the digital signal at the output terminal of image freeze device 8, and generates a luminance signal Y and a complex image signal C. Y/C mixer 6 then projects the original image by mixing the complex image signal C with the luminance signal Y outputted from DCP 5.

Synchronizing signal generator 7 outputs horizontal synchronizing signal HD, vertical synchronizing signal VD, and field signal FD, which in combination control the operation of image freeze device 8.

Figure 3:
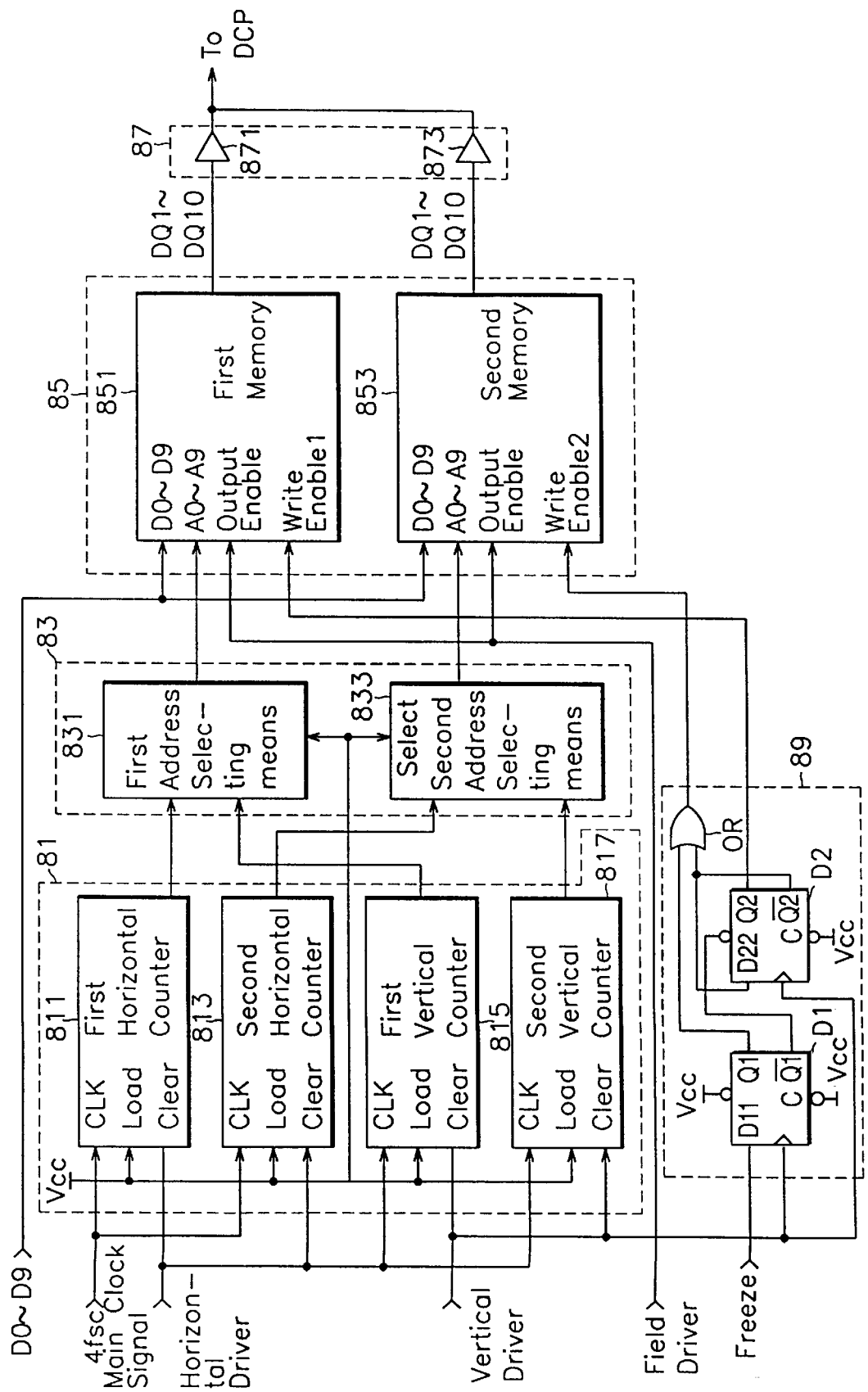
FIG. 3 is a block diagram illustrating an image freeze device.

FIG. 3 illustrates a block diagram of image freeze device 8 in accordance with an embodiment of the present invention. As shown, image freeze device 8 comprises counter section 81, address selection section 83, memory 85, buffer section 87, and write signal output section 89. The output terminal of counter section 81 is linked to input terminal of address selection section 83. The output terminal of address selection section 83 is linked to memory 85, which in turn is linked to buffer section 87.

Counter section 81 includes first horizontal counter 811, second horizontal counter 813, first vertical counter 815, and second vertical counter 817. Specifically, counters 811, 813, 815, and 817 each has a clock terminal and a clear terminal. The clock terminal of counters 811 and 813 is linked to a main clock signal 4fsc. The clear terminal of counters 811 and 813 is linked to horizontal synchronizing signal HD. The clock terminal of counters 815 and 817 is linked to horizontal synchronizing signal HD. The clear terminal of counters 815 and 817 is linked to vertical synchronizing signal VD.

Address selection section 83 includes first address selector 831 and second address selector 833. First address selector 831 multiplexes the counts outputted from first horizontal counter 811 and first vertical counter 815 into a first memory address. Second address selector 833 multiplexes the counts outputted from second horizontal counter 813 and second vertical counter 817 into a second memory address. Specifically, address selectors 831 and 833 each multiplex the counts using a 2×1 multiplexer.

Memory 85 comprises first memory 851 and second memory 853. First memory 851 stores and/or outputs image data corresponding to the address outputted from first address selector 831. Second memory 853 stores and/or outputs image data corresponding to the address outputted from second address selector 833. Specifically, first memory 851 stores the odd field of each image data, and second memory 853 stores the even field of each image data.

Figure 4:
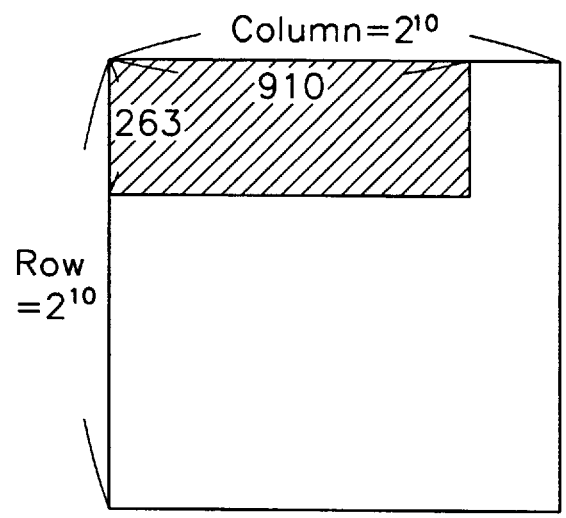
FIG. 4 is a diagram illustrating a memory in conformity with the preferred embodiments of the present invention.

In an embodiment of the present invention, one horizontal line per period is 63.5 $\mu$s, and thus, memory 85 supports 910 addresses per one column, 525 addresses per one frame, and 262.5 addresses per one field. Accordingly, as described in FIG. 4, memory 85 includes about 1M bits of memory, and more specifically, 1M×10 bits of RAM because the output of A/D converter 4 is 10 bits.

Buffer section 87 comprises first buffer section 871 and second buffer section 873. First buffer section 871 temporarily stores the image data outputted from first memory 851, and second buffer section 873 temporarily stores the image data outputted from second memory 853.

Write signal output section 89 comprises first D flip-flop D1, second D flip-flop D2, and an OR gate. First D flip-flop D1 has an input terminal D11, clock terminal, preset terminal, output terminal Q1, and inverting output terminal $\overline{Q1}$. Input terminal D11 is linked to freeze switch S1, and the clock terminal is linked to vertical synchronizing signal VD.

Second D flip-flop D2 has an input terminal D22, clock terminal, preset terminal, output terminal Q2, and inverting output terminal $\overline{Q2}$. The preset terminal is linked to inverting output terminal $\overline{Q1}$ of first D flip-flop D1, and the clock terminal is linked to vertical synchronizing signal VD. Input terminal D22 is linked to inverting output terminal $\overline{Q2}$.

A first terminal of the OR gate is linked to output terminal Q1 of first D flip-flop D1. A second terminal of the OR gate is linked to inverting output terminal $\overline{Q2}$ and input terminal D22 of second D flip-flop D2. Output terminal Q2 of second D flip-flop D2 is linked to a write enable terminal of first memory 851, and an output terminal of the OR gate is linked to a write enable terminal of second memory 853.

Accordingly, in conformity with the embodiments of the present invention, the operation of the image freeze device is as follows: The still image output function is carried out by steadily outputting one frame of an image data, which has been picked up from CCD element 2 and stored in memory 85.

In the case where first memory 851 stores one field of the picked-up image data, the image data stored in second memory 853 is read into buffer section 87. Meanwhile, in the case where the second memory stores the image data, the image data stored in the first memory is read into buffer section 87. When the still image output function is selected, the reading process of the image data stored in memory 85 is processed so that only the image corresponding to a frame is projected through monitor 12. In order to output a dynamic picture image, image data has to be written in memory 85 and be read out of memory 85 at the same time because the characteristic of the video's time signal barely allows data to be read in one memory cell and new data to be written in the same memory cell simultaneously.

According to the output principle of the still image, the operation of the image freeze device will be explained as follows: CCD element 2 transforms a light signal incident from lens 1 into an electrical signal. Sampling device 3 samples the resulting electrical signal first at a clock frequency of, for example, about 7.16 MHZ, and then again samples the signal at a frequency of, for example, 14.318 MHZ. Sampling device 3 then outputs the sampled electrical signal to A/D converter 4, which quantizes the sampled signal into, for example, a 10 bit digital signal and outputs the digital signal to image freeze device 8.

In conformity with the embodiments of the present invention, the image data in an odd field is stored in first memory 851 and the image data in an even field are stored in the second memory 853.

Horizontal counters 811 and 813 of the counter section 81 count column addresses according to the main clock signal 4fsc, and vertical counters 815 and 817 count row addresses according to the horizontal synchronizing signal HD outputted from the synchronizing signal generator 7, and so the corresponding addresses are inputted to the address selection section 83.

The first address selection section 831 designates an address of the first memory 851 for storing or outputting 10 bits of image data in an odd field outputted from the A/D converter 4, according to the address outputted from the first horizontal counter 811 and the first vertical counter 815.

The second address selection section 833 designates an address of the second memory area 853 for storing or outputting 10 bits of image data in an even field according to the address outputted from the second horizontal counter 813 and the second vertical counter 817.

The memory 85 performs the operation of storing the image data corresponding to the designated area according to the signal outputted from a write signal generator 89 and an applied field signal FD.

When being operated under the normal mode, that is, when a picked up image continues to be outputted on a monitor, a freeze signal in a low state is inputted to an input terminal of the first D flip-flop D1 of the write signal generator 89 since a freeze switch S1 is off.

The first D flip-flop D1 is driven by the vertical synchronizing signal VD, and outputs an "L" signal as a low level at an output terminal Q1 and an "H" signal as a high level at an inverting output terminal $\overline{Q1}$ according to the freeze signal inputted in an "L" state.

Figure 5:
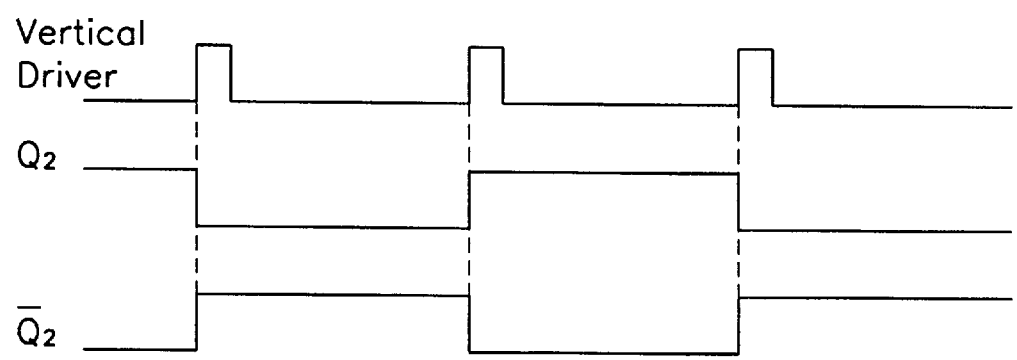
FIG. 5 is a diagram illustrating the operation of an image freeze device depending on the lapse of time in conformity with the preferred embodiments of the present invention.

Accordingly, as shown in FIG. 5, by applying an "H" signal to the preset terminal of the second D flip-flop D2, a signal state of the output terminal Q2 is able to be changed according to the changes of the input signal of the second D flip-flop D2.

The OR gate performs an OR operation of the output signal Q1 of the first D flip-flop D1 and the inverted output terminal $\overline{Q2}$ of the second D flip-flop D2, and outputs the corresponding signal to the write enable terminal of the second memory 853. By applying the signal outputted from the second D flip-flop to the write enable terminal of the first memory, the write operation of the first memory 851 and the second memory 853 can be repeatedly performed.

However, when in the still image output mode, a freeze mode is set up by the operation of the freeze switch S1, a freeze signal of "H" is inputted to the input terminal of the first D flip-flop D1.

As the freeze signal in a high state is applied, the first D flip-flop D1 outputs the "H" signal, and as an "L" signal is applied, the second D flip-flop D2 always outputs an "H" signal.

Consequently, since the OR gate always outputs an "H" signal, the second memory 853 only performs the reading operation when the freeze switch S1 is operating, and the first memory 851 also only performs the reading operation according to the "H" signal outputted from the second D flip-flop D2 when the freeze switch S1 is operating.

As mentioned above, in case the reading operation alone is performed, the first memory 851 reads and outputs to the buffer section 87 the odd field of the image data stored prior to the operation of the freeze switch S1, and the second memory 853 also reads and outputs to the buffer section 87 the even field of the image data stored prior to the operation of the freeze switch S1.

The buffer section 87, as illustrated in FIG. 3, outputs one frame of image data outputted from the memory 85 to the Digital Camera Processor (DCP) 5, and the DCP 5 processes the image data according to the applied synchronizing signal and generates and outputs the corresponding brightness signal Y and the complex image signal C.

The brightness signal Y and the complex image signal C are outputted as a video signal through the Y-C mixer 6, and the video signal, as illustrated in FIG. 2, is transformed into an image through an independent image display device.

In the case where the freeze mode is set up as above, the image corresponding to one frame alone is projected through the image display device.

Here, the image data picked up from the CCD 2 is not stored in the memory 85.

Accordingly, in accordance with the embodiments of the present invention, in the case where a still image is needed, the formerly realized image alone can be selectively projected through an image display device.

Furthermore, in the case where the position of an object may be varied, or the projected image may be shaken from an outer impact, the present invention can provide an image freeze device having the effect of projecting an exact still image by stopping the corresponding moving image.

What is claimed is:

1. An image freeze device comprising:
   means for selecting a still image output mode;
   a write signal generator for outputting a write signal corresponding to an operational state of the still image output mode selection means;
   a counter for counting a number of column addresses and a number of row addresses when driven by a main clock signal and a plurality of synchronizing signals;
   an address selecting means for designating an area corresponding to the column addresses and the row addresses; and
   a memory for storing image data in the area designated by the address selecting means when the memory is write-enabled by the write signal and for outputting the image data stored in the designated area when the memory is output-enabled by an applied field signal.

2. The image freeze device of claim 1 wherein the write signal generator activates the write signal during the operation of the selecting means of the still image output mode.

3. The image freeze device of claim 2 wherein the write signal generator comprises:
   a first D flip-flop which is driven by a vertical synchronizing signal and which outputs a first signal corresponding to a signal outputted from the still image output mode selection means;
   a second D flip-flop in which a preset state corresponds to an inverted output signal of the first D flip-flop and in which an input signal corresponds to a feedback inverting output signal of the second D flip-flop; and
   an OR operation means for performing an OR operation of the first signal outputted from the first D flip-flop and the inverting output of the second D flip-flop.

4. The image freeze device of claim 1 wherein the counter comprises:
   a first horizontal counter for counting an odd field of the column addresses when driven by the main clock signal;
   a first vertical counter for counting an odd field of the row addresses when driven by a horizontal synchronizing signal;
   a second horizontal counter for counting an even field of the column addresses when driven by the main clock signal; and
   a second vertical counter for counting an even field of the row addresses when driven by the horizontal synchronizing signal.

5. The image freeze device of claim 4 wherein the address selecting means comprises:
   a first address selector for multiplexing the count of the odd field of the column addresses from the first horizontal counter and the count of the odd field of the row addresses from the first vertical counter; and
   a second address selector for multiplexing the count of the even field of the column addresses from the second horizontal counter and the count of the even field row addresses from the second vertical counter.

6. The image freeze device of claim 5 wherein the first address selector and the second address selector comprise:
   a 2×1 multiplexer.

7. The image freeze device of claim 5 wherein the memory comprises:
   a first memory for storing or outputting an odd field of the image data in the area designated by the multiplexed count from the first address selector; and
   a second memory for storing and outputting an even field of the image data in the area designated by the multiplexed count from the second address selector.

8. The image freeze device of claim 1 further comprising a buffer section for temporarily storing the image data outputted from the memory.

9. A video presenter comprising:

a pickup element for transforming a light signal incident from a lens into a corresponding image signal;

A/D converter for transforming the image signal into image data;

an image freeze device for storing and outputting the image data outputted from the A/D converter according to an operational state of a still image output mode selection means;

an image processing device for processing the image data outputted from the image freeze device and outputting a corresponding luminance signal and a chrominance signal; and an image output device for mixing the luminance signal and the chrominance signal outputted from the image processing device and outputting the corresponding image signal.

10. The video presenter of claim 9 wherein the image freeze device comprises:

a write signal generator for outputting a write signal corresponding to the operational state of the still image output mode selection means;

a counter for counting row addresses and column addresses when driven by a main clock signal and a number of synchronizing signals;

an address selecting means coupled to the counter for designating an area corresponding to the column addresses and the row addresses; and memory for storing in the designated area an image data applied according to the signal outputted from the write signal generator and for outputting the image data stored in the designated area according to an applied field signal.

11. The video presenter of claim 10 wherein the write signal generator activates the write signal during the operation of the still image output mode selection means.

* * * * *